United States Patent [19]

Koshizawa

[11] Patent Number: 4,823,643
[45] Date of Patent: Apr. 25, 1989

[54] ELECTRONIC AUTOMATIC GEAR TRANSMISSION CONTROL APPARATUS

[75] Inventor: Toshifumi Koshizawa, Kawasaki, Japan

[73] Assignee: Isuzu Motors Limited, Tokyo, Japan

[21] Appl. No.: 138,726

[22] Filed: Dec. 28, 1987

[30] Foreign Application Priority Data

Dec. 27, 1986 [JP] Japan .................. 61-315291

[51] Int. Cl.$^4$ ............................................ B60K 41/04
[52] U.S. Cl. ......................................... 74/866; 74/877
[58] Field of Search ................ 74/866, 865, 861, 877

[56] References Cited

U.S. PATENT DOCUMENTS

| | | | |
|---|---|---|---|
| 4,319,501 | 3/1982 | Sugimoto | 74/866 |
| 4,350,234 | 9/1982 | Suga et al. | 74/866 |
| 4,486,838 | 12/1984 | Itoh et al. | 74/866 |
| 4,501,170 | 2/1985 | Muller | 74/866 |
| 4,637,278 | 1/1987 | Nishikawa | 74/866 |
| 4,643,048 | 2/1987 | Hattori et al. | 74/866 |
| 4,718,309 | 1/1988 | Moriya | 74/866 |

Primary Examiner—Dirk Wright
Assistant Examiner—Harold F. Macris
Attorney, Agent, or Firm—Staas & Halsey

[57] ABSTRACT

An electronic gear transmission control apparatus commands an optimum gear position based on a shift schedule map according to a vehicle speed and an accelerator opening. When an upshift over two or more gear positions is commanded on the basis of the shift schedule map, a gear shift to the commanded gear position is restrained, and a gear shift to a gear position which is one gear position higher than the present gear position is effected for a prescribed period of time.

2 Claims, 5 Drawing Sheets

Fig. 3
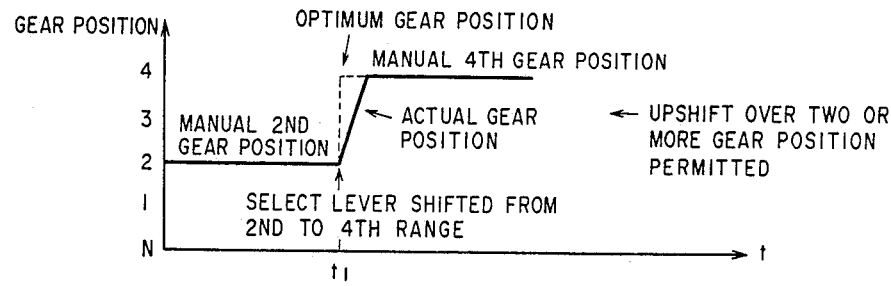
(a) WHEN MANUAL RANGE IS SELECTED:
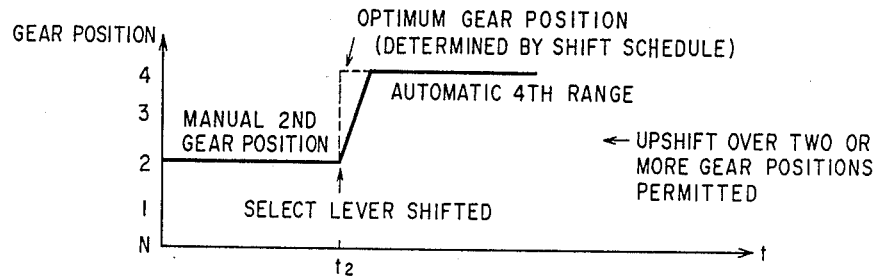
(b) WHEN AUTOMATIC RANGE IS SELECTED AFTER MANUAL RANGE:
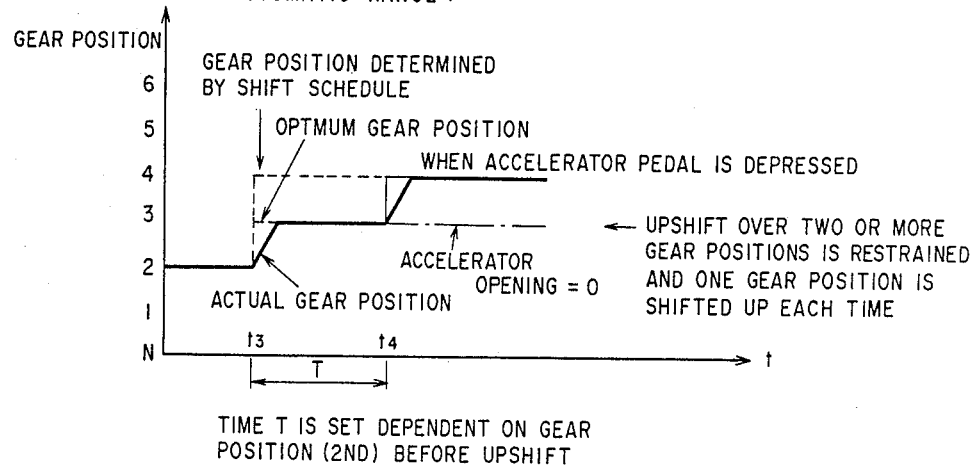
(c) WHEN UPSHIFT OVER TWO OR MORE GEAR POSITIONS IS COMMANDED IN AUTOMATIC RANGE:

ELECTRONIC AUTOMATIC GEAR TRANSMISSION CONTROL APPARATUS

BACKGROUND OF THE INVENTION

The present invention relates to an electronic automatic gear transmission control apparatus for automatically selecting an optimum gear position dependent on the running condition of a motor vehicle.

Electronic automatic gear transmission control apparatus have been proposed for accurately controlling gear transmissions with electronic control units.

In such an electronic automatic gear transmission control apparatus, a vehicle speed signal (pulses) from a vehicle speed sensor, a signal (voltage), corresponding to the amount of depression of an accelerator pedal, from an accelerator pedal sensor, and a select signal (matrix signal) from a select lever are applied to an electronic control unit, which then produces a control signal to operate a clutch actuator and a transmission actuator for thereby successively disconnecting a clutch, bringing the gears into a neutral position, selecting a desired gear position, shifting the gears, and connecting the clutch.

Shift maps selected by the select levers have upshifting and downshifting maps determined by the amount of depression of the accelerator pedal and the vehicle speed. The gear changing operation is effected according to these maps.

FIG. 4 of the accompanying drawings shows a shift schedule map by way of example. The shift schedule map is represented by a graph having a horizontal axis indicating vehicle speeds (km/H) and a vertical axis indicating amounts of accelerator opening ranging from an idling position to a fully open position. The solid-line curves represent shift-up schedules for respective gear positions, and the dotted-line curves represent shift-down schedules for respective gear positions.

According to a conventional process of determining an optimum gear position using only the shift schedules, when the vehicle is accelerated by depressing the accelerator pedal and then enters a normal running state by releasing the accelerator pedal, the transmission gears tend to be shifted up two gear positions or more. When the accelerator pedal is subsequently depressed slightly to keep the normal running state, the transmission gears are shifted down. For example, when the vehicle running in the third gear position is accelerated and then the accelerator pedal is released, the transmission skips the fourth gear position and jumps into the fifth gear position, and when the accelerator is subsequently depressed to a small degree the transmission is shifted down into the fourth gear position.

A slight release of the accelerator pedal for gaining a normal running state and re-depression of the accelerator pedal to keep the normal running state are effected in a relatively short period of time. Therefore, in the above example, the gear shift from the third gear position into the fifth gear position while skipping the fourth gear position is useless, but an upshift from the third gear position directly into the fourth gear position should be effected. However, the conventional electronic gear automatic transmission control apparatus have failed to shift the gears for such a direct upshift.

When the driver wants to use engine braking for traffic conditions ahead while the vehicle is being accelerated, the driver releases the accelerator pedal to activate engine braking. In this case, an upshift over two or more gear positions is likely to occur, and hence effective engine braking is not available.

SUMMARY OF THE INVENTION

It is an object of the present invention to provide an electronic automatic gear transmission control apparatus capable of preventing unnecessary gear shifting operation due to an upshift over two or more gear positions based on shift schedules dependent on vehicle speeds and amounts of accelerator opening, and a downshift immediately after such an upshift.

Another object of the present invention is to provide an electronic automatic gear transmission control apparatus capable of inhibiting an upshift over two or more gear positions based on shift schedules when an accelerator pedal is released for engine braking, so that effective engine braking will be available.

According to the present invention, an electronic automatic gear transmission control apparatus having a shift schedule map for commanding an optimum gear position based on a vehicle speed signal and an accelerator opening signal, the electronic automatic gear transmission control apparatus comprising means for comparing a gear position commanded by the shift schedule map with a present gear position, and means for restraining a gear shift to the commanded gear position and effecting a gear shift to a gear position which is one gear position higher than the present gear position for a prescribed period of time, if the commanded gear position requires an upshift to a gear position which is two or more gear positions higher than the present gear position as a result of comparison in the comparing means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing gear shifting characteristics; and

DESCRIPTION OF THE PREFERRED EMBODIMENT

Figure 1:
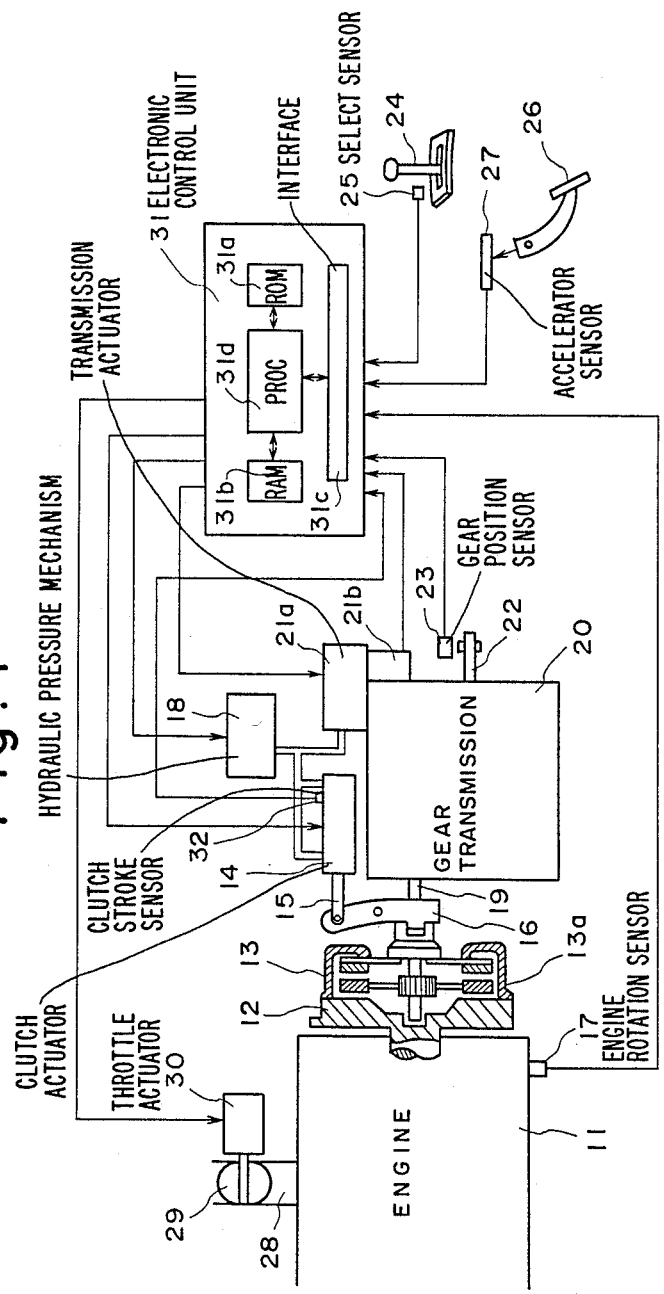
FIG. 1 is a block diagram of an electronic automatic gear transmission control apparatus according to the present invention.

As shown in FIG. 1, an engine 11 has an output shaft on which a flywheel 12 is mounted. The engine 1 includes a carburetor 28 having a throttle valve 29 for controlling the mixture of fuel and air to be drawn into the engine 1. The throttle valve 29 is controlled in operation by a throttle actuator 30 in the form of a step motor.

A clutch 13 is in the form of a known friction clutch which is engaged and disengaged by a release lever 16. The release lever 16 is operated by a clutch actuator 14 having a piston rod 15 coupled to the release lever 16. The clutch actuator 14 is operated by control hydraulic pressure from a hydraulic pressure mechanism 18. A gear transmission 20 has an input shaft 19 coupled to a driven plate 13a of the clutch 13. The gears of the gear transmission 20 are shifted by a transmission actuator 21a which is operated by control hydraulic pressure from the hydraulic pressure mechanism 18.

An engine rotation sensor 17 is disposed near the flywheel 12. A vehicle speed sensor 23 is disposed in the vicinity of an output shaft 22 of the gear transmission 20. The selected gear position of the gear transmission 20 is detected by a gear position sensor 21b. The operating position of the clutch actuator 14 is detected by a clutch stroke sensor 32. Detected signals from these sensors are applied to an electronic control unit 31.

A select lever 24 is operated by the driver to move into various positions to select various manual ranges such as an "N" range (neutral gear position), an "R" range (reverse gear position), a "1" range (first gear position), a "2" range (second gear position), a "3" range (third gear position), a "4" range (fourth gear position), and a "5" range (fifth gear position), and a "D" range (an automatic gear shift from 1st to 6the gear positions). The selected position of the select lever 24 is detected by a select sensor 25 which applies a detected signal to the electronic control unit 31.

The amount of depression (accelerator opening) of an accelerator pedal 26 is detected by an accelerator sensor 27 which applies a detected signal to the electronic control unit 31.

The electronic control unit 31 comprises memories such as a ROM 31a and a RAM 31b, an interface 31c, and a processor 31d. The electronic control unit 31 determines an optimum gear position based on the detected signals from the various sensors and applies control signals to the transmission actuator 21a, the clutch actuator 14, the throttle actuator 30, and the hydraulic pressure mechanism 18.

Figure 2:
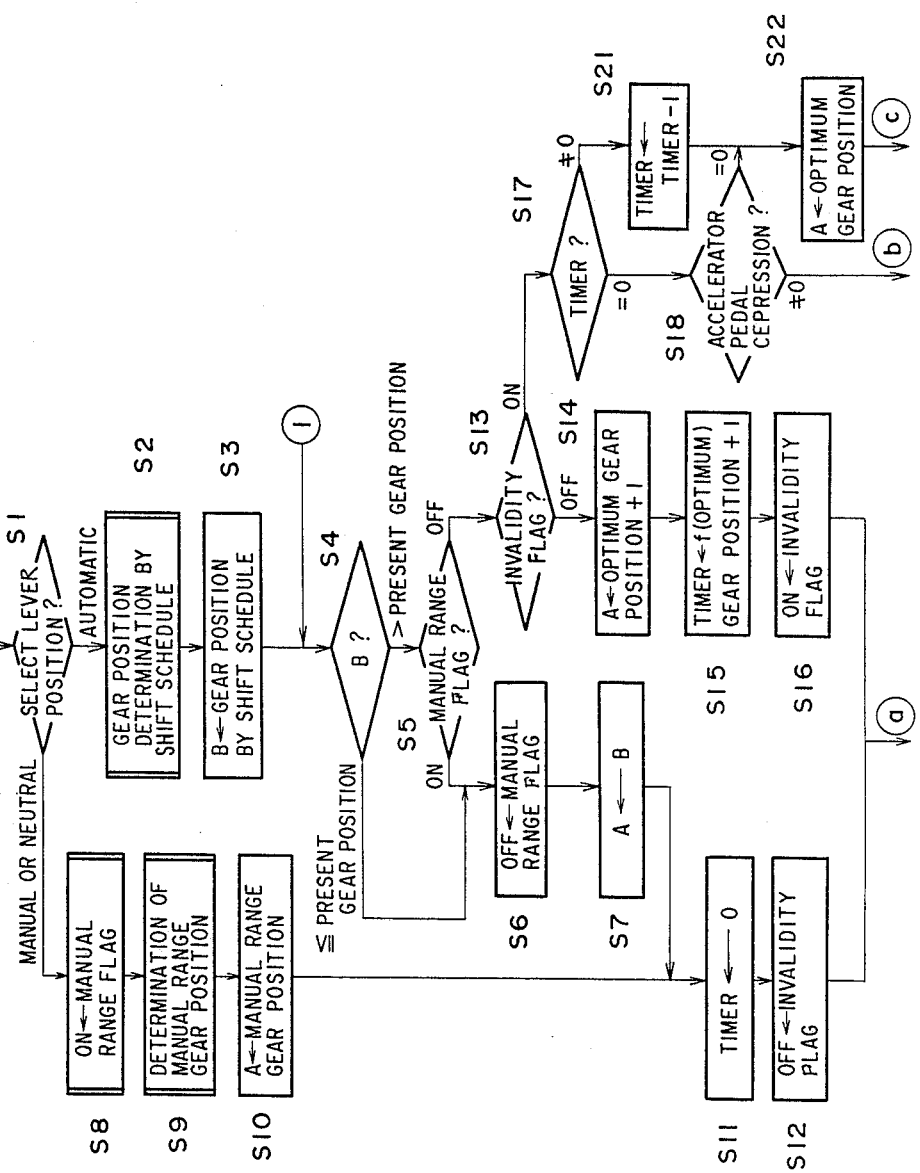
FIGS. 2(a) and 2(b) are a flowchart of a processing sequence for determining an optimum gear position according to the present invention.
Figure 2:
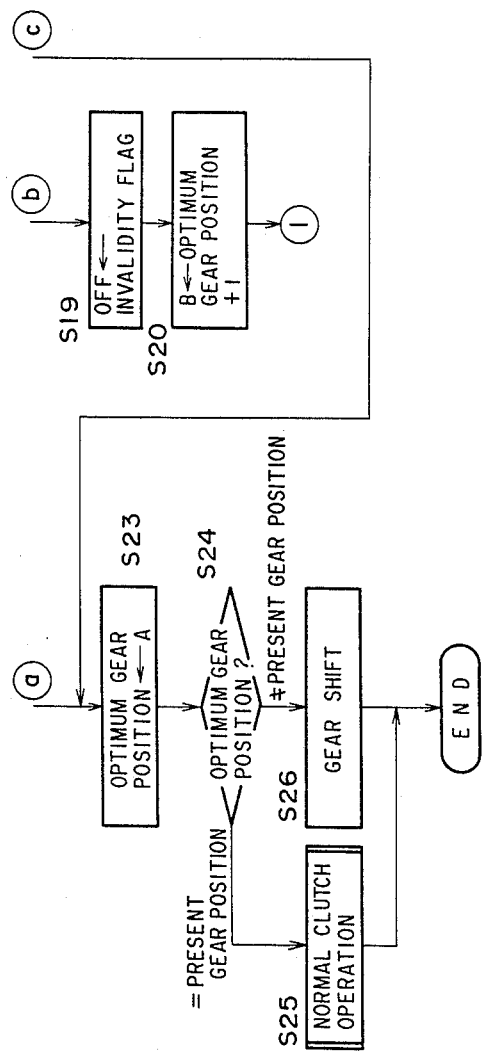
Figure 4:
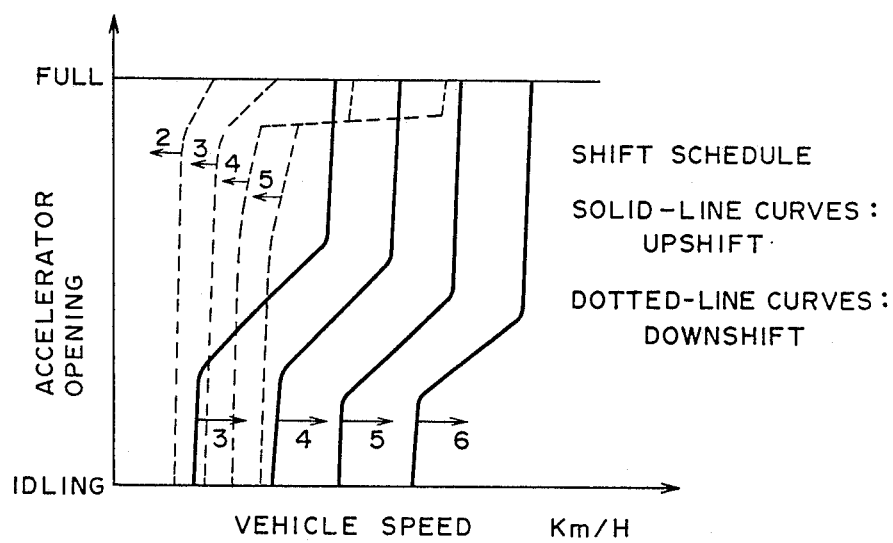
FIG. 4 is a graph showing shift schedules for a gear transmission.

Means for determining an optimum gear position according to the present invention will be described with reference to the flowchart of FIGS. 2(a) and 2(b).

(1) Manual range:

If the select lever 24 is in one of the manual ranges or the neutral range in a step S1, then control goes to a step S8.

A manual range flag is used in the automatic gear shift range to determine that the automatic gear shift range is selected after a manual range. During the manual range, the manual range flag is ON (step S8).

According to the selected manual range, a gear position to be reached is determined in a step S9, and the determined gear position is stored in a memory A (step S10). Then, a timer is reset for restraining a two-gear-position upshift command in the automatic gear shift range in a step S11, and an invalidity flag which is ON while the two-gear-position upshift command is being restrained is reset (OFF) in a step S12.

Thereafter, the stored data of the memory A given in the step S10 is substituted for a memory optimum gear position used as an actual optimum gear position in a step S23. The optimum gear position is compared with the present gear position in a step S24. If the optimum gear position and the present gear position are the same as each other, then the clutch is operated normally in a step S25. If the optimum gear position and the present gear position are different from each other, then the gear transmission is shifted into the optimum gear position in a step S26.

(2) Automatic gear shift range:

If the automatic gear shift range is selected in the step S1, then a gear position to be reached is determined by a shift schedule in a step S2, and the determined gear position is stored in a memory B in a step S3. Then, the stored gear position is compared with the present gear position in a step S4. If the stored gear position in the memory B is a downshift from or the same as the present gear position, then the manual range flag is OFF in a step S6, the data of the memory B is transferred to the memory A, and then control goes to the step S11, in order to effect a gear shift to the gear position stored in the memory B. Subsequent operation is the same as in the manual range (1).

If the stored gear position in the memory B is a higher gear position than the present gear position (i.e., an upshift command), then the manual range flag is checked in a step S5. If the manual range flag is ON, the automatic gear shift range has been selected after a manual range, and hence control goes to the step S6 in order to permit a gear shift to the gear position according to the shift schedule.

If the manual range flag is OFF in the step S5, then the invalidity flag is checked in a step S13. If the invalidity flag is OFF, then in order to inhibit an upshift over two or more gear positions, a gear position equal to (preceding optimum gear position + one gear position) is stored in the memory A in a step S14, and a value corresponding to a time period in which to shift to that gear position is determined using the preceding optimum gear position as a factor, and given to a timer in a step S15. Thereafter, the invalidity flag which indicates that the two-gear-position upshift command is restrained is ON in a step S16, from which control goes to the step S23 for a one-gear-position upshift.

If the invalidity flag is ON in the step S13 (i.e., inhibiting an upshift over two or more gear positions), then the value of the timer is checked in a step S17. If the value of the timer is not 0 ($\neq$0), then the value of the timer is decremented in a step S21, and the preceding gear position is substituted for the memory A in a step S22 followed by the step S23 in order to keep a one-gear-position upshift.

If the timer value=0 in the step S17, then the amount of depression of the accelerator pedal is confirmed in a step S18 so as to check the condition for the completion of the one-gear-position upshift. If the amount of depression of the accelerator pedal=0, i.e., in the idling position, then control goes to the step S22 to prevent an upshift over two or more gear positions in order to ensure engine braking.

If the amount of depression of the accelerator pedal$\neq$0, then in order to effect an upshift over two or more gear positions, the invalidity flag is OFF in a step S19, and a gear position equal to (preceding optimum gear position + one gear position) (i.e., two-gear-position upshift) is substituted for the memory A, after which control returns to the step S4. If the first upshift is for three or more gear positions, the above process is repeated to effect an upshift for each gear position.

FIG. 3 shows gear shifting characteristics of the gear transmission on graphs each having a horizontal axis indicative of time t and a vertical axis indicative of gear positions.

FIG. 3(a) shows an example in which a manual range is selected and an upshift over two or more gear positions is permitted. In this example, the vehicle runs with the gear transmission in the manual 2nd gear position up to a time t1, whereupon the select lever is shifted to set the gear position from the "2" range to the "4" range. The gear position is shifted to the manual 4the gear position with a slight time delay from the time t1.

FIG. 3(b) illustrates an example in which the automatic gear shift range is selected after a manual range and an upshift over two or more gear positions is permitted. The vehicle runs with the gear transmission in the manual 2nd gear position up to a time t2, whereupon the select lever is shifted to the "D" range for the automatic range. The gear position is shifted to the automatic 4th gear position with a slight time delay from the time t2.

FIG. 3(c) shows an example according to the arrangement of the present invention, in which an upshift over two or more gear positions is commanded in the automatic gear shift range. The upshift over two or more gear positions is restrained, and an upshift for one gear position is effected each time. In this example, The vehicle runs with the gear transmission in the automatic 2nd gear position up to a time t3. At the time t3, though the 4th gear position is determined by the shift schedule, the gear transmission is shifted up to the optimum 3rd gear position when the amount of depression of the accelerator pedal is 0. When the accelerator pedal is depressed at a time t4, the gear transmission is shifted to the 4th gear position. The time period T from the time t3 to the time t4 is set dependent on the gear position (2nd in this example) before the upshift is started.

With the present invention, as described above, there is provided means for effecting an upshift to a gear position which is one gear position higher than the present gear position for a time period that is determined dependent on the present gear position, when an upshift over two or more gear positions is commanded. Therefore, unnecessary gear shifts such as an upshift over two or more gear positions according to a conventional optimum gear position determining process using shift schedules and an accompanying downshift are avoided, and the engine power and performance can be improved by eliminating the time which would otherwise be required by such unnecessary gear shifts.

In the conventional gear shifting process, an upshift over two or more gear positions tends to be carried out even when the accelerator pedal is released for engine braking, and hence effective engine braking is not available. This problem can be solved by the present invention since an upshift over two or more gear positions is inhibited in the present invention.

Although a certain preferred embodiment has been shown and described, it should be understood that many changes and modifications may be made therein without departing from the scope of the appended claims.

What I claim is:

1. An electronic automatic gear transmission control apparatus having a shift schedule map for commanding an optimum gear position based on a vehicle speed signal and an accelerator opening signal, said electronic automatic gear transmission control apparatus comprising:
    first means for comparing a gear position commanded by the shift schedule map with a present gear position;
    second means for effecting a gear shift to a gear position which is one gear position higher than the present gear position and for restraining a gear shift to the commanded gear position for a prescribed period of time, if the commanded gear position requires an upshift to a gear position which is two or more gear positions higher than the present gear position as a result of the comparison performed by said first means; and
    third means for holding the gear position which is one gear position higher than the present gear position until an accelerator pedal is depressed again, when the accelerator opening signal indicates an idling position while the gear shift up to the gear position which is one gear position higher than the present gear position, is being effected by said second means.

2. An electronic automatic gear transmission control apparatus according to claim 1, wherein said second means comprises means for determining the prescribed period of time in dependence upon the present gear position.

* * * * *